United States Patent [19]

Mikkelson et al.

[11] 4,084,013

[45] Apr. 11, 1978

[54] PROCESS FOR FORMING SIMULATED NUT-LIKE FOODS

[75] Inventors: Marvin O. Mikkelson, Atchison, Kans.; Boyd R. Rasmus, Fridley, Minn.

[73] Assignee: The Pillsbury Company, Minneapolis, Minn.

[21] Appl. No.: 751,283

[22] Filed: Dec. 16, 1976

[51] Int. Cl.$^2$ .......................... A23L 1/34; A23L 1/36
[52] U.S. Cl. ................... 426/601; 426/516; 426/98
[58] Field of Search ................ 426/98, 601, 656, 657, 426/516, 609, 473

[56] References Cited

U.S. PATENT DOCUMENTS

| | | | |
|---|---|---|---|
| 2,952,544 | 9/1960 | Durst et al. | 426/98 |
| 3,719,497 | 3/1973 | Galle et al. | 426/98 X |
| 3,872,229 | 3/1975 | Durst et al. | 426/62 |
| 3,872,230 | 3/1975 | Sinner et al. | 426/98 |
| 3,966,998 | 6/1976 | Rawlings et al. | 426/656 X |

*Primary Examiner*—Raymond N. Jones
*Assistant Examiner*—R. A. Yoncoskie
*Attorney, Agent, or Firm*—James V. Harmon; Michael D. Ellwein; Mart C. Matthews

[57] ABSTRACT

A continuous process is described for forming simulated nut-like food products by providing a mixing vessel or a plurality of vessels which include mixing zone portions distributed along the flow path of the material being prepared with one or more fluid inlets between the portions of the mixer. An edible hydratable film former and a fat in liquid form are introduced and mixed continuously in one portion of the mixer. Water is introduced continuously through the inlet at a point intermediate the ends of the mixer and the mixture thus formed is continuously agitated to produce an aqueous dispersion in which the film forming substance is hydrated by the added water to form a stable dispersion which is then molded or otherwise formed and dried to a moisture content of 10% or less.

4 Claims, 3 Drawing Figures

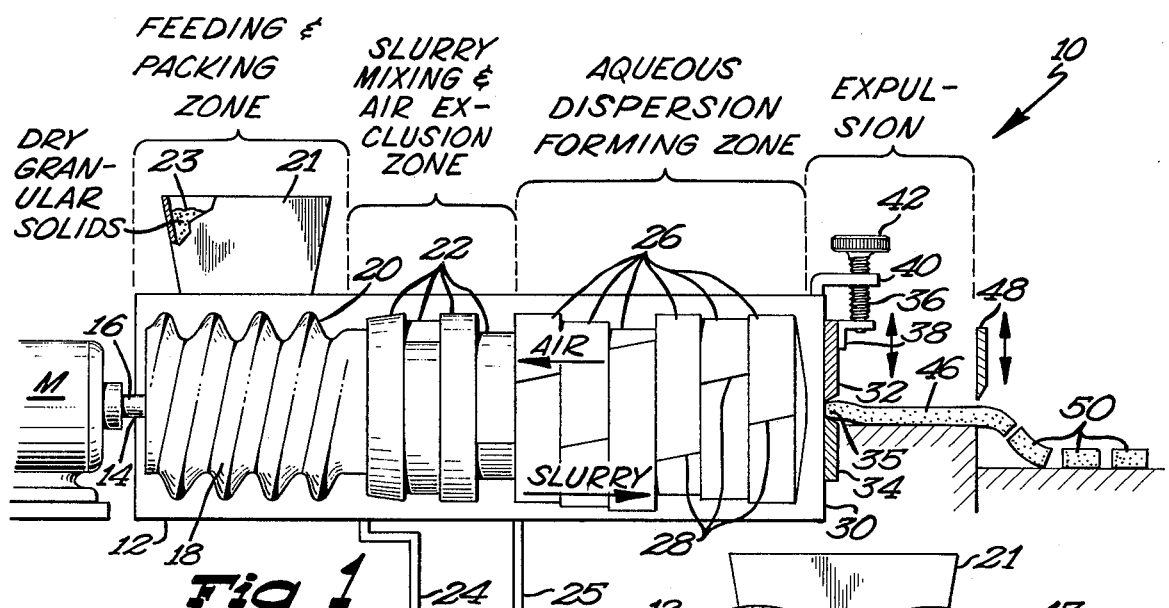
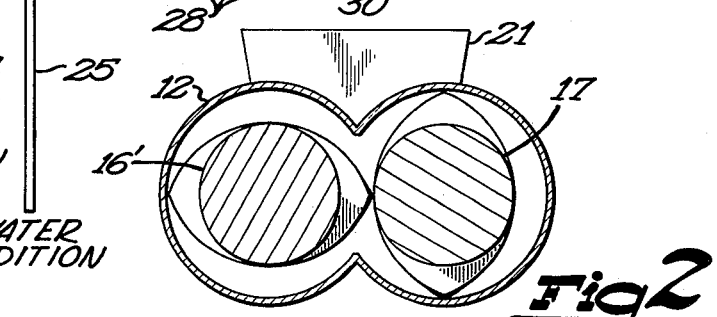
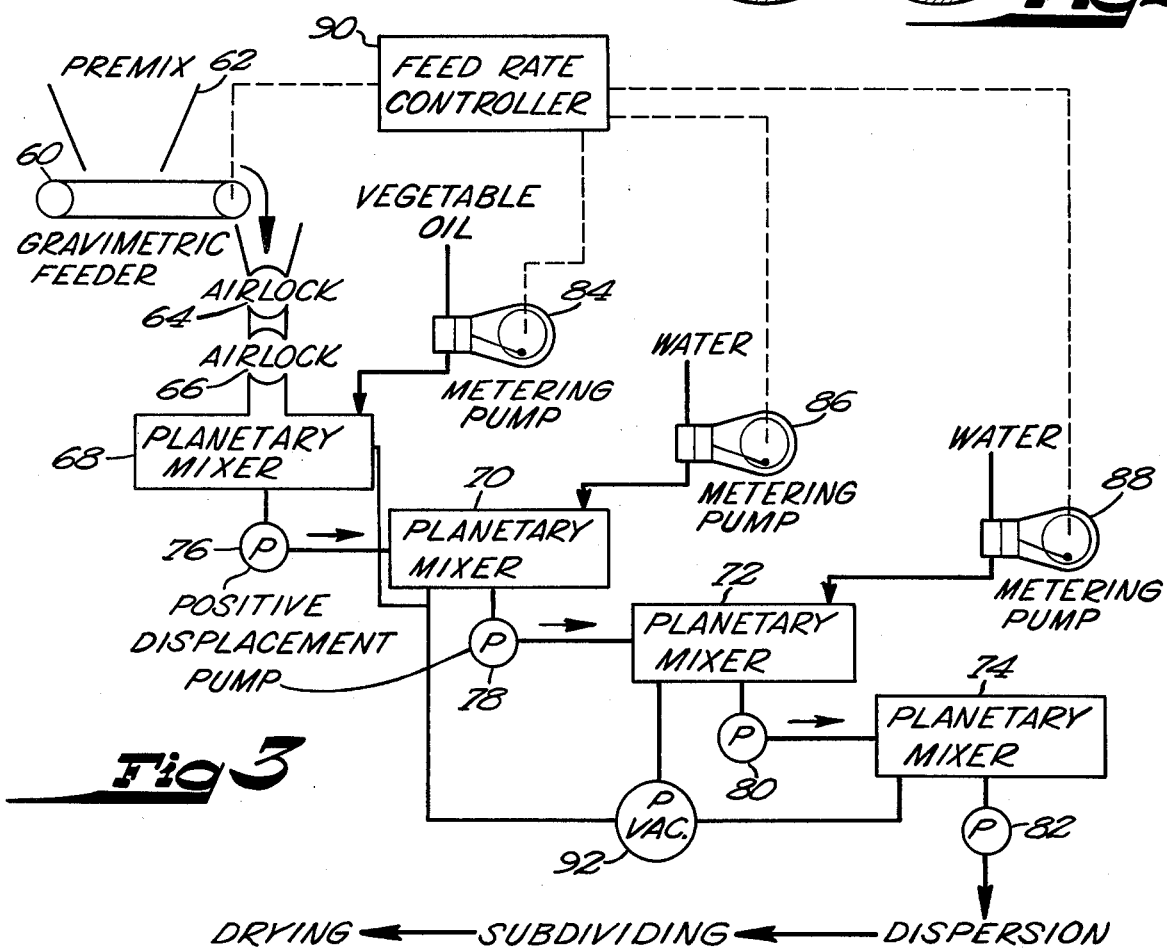

PROCESS FOR FORMING SIMULATED NUT-LIKE FOODS

FIELD OF THE INVENTION

The invention describes a process for preparing foods and more particularly to an improved continuous process for forming foods comprising a mixture of fat, film former and water.

THE PRIOR ART

The present invention is concerned with the preparation of foods having a nut-like texture as described in U.S. Pat. Nos. 2,952,544, 3,872,229 and 3,872,230 which are incorporated herein by reference. While the products produced by these patents are for the most part outstanding, it has only been possible to prepare the product by batch mixing i.e. mixing a predetermined finite quantity. Thus the components of the dispersion were usually placed in a mixing bowl of, say, 50 gallons capacity fitted with paddle blades in which mixing carried out for 15 minutes or more to obtain a dispersion. In a typical example, the ingredients including oil were placed in a stainless steel mixing bowl equipped with a sigma mixing blade. After the top of the mixer was put in place, a vacuum was drawn and mixing was continued at high speed for 15 minutes. The resulting dispersion was then either spread onto a polyethylene sheet for air drying or transferred to an extruder such as a roll extruder for conversion to ribbon form and dried.

Batch mixing in this manner is relatively slow, requires substantial amount of manual labor and is consequently expensive. It also introduces a number of opportunities for error, resulting in poor or wasted batches for example, as the result of mismeasurement, overmixing, etc.

With these problems in mind, continuous processing was attempted in the development of the present invention. In the course of this work it was found that the forming simulated nutmeats was sensitive to processing conditions and liable to failure, usually in one of three modes. Oil would sometimes run or exude from the finished product rendering it unsatisfactory. Another mode of failure was the inability to form a dispersion which was stable to further processing, that is to say, the dispersion would separate into aqueous and nonaqueous phases. Finally, in some cases it was found that the finished product while appearing satisfactory to the eye, when chewed would exhibit a texture unlike that of a real nutmeat which is one major objective of the invention.

At the risk of oversimplification, it was discovered that most of these and other problems encountered in continuous preparation appeared to result from one or more of the following processing deficiencies: The inability to feed premixed oil and water into the system accurately i.e. at a precisely controlled rate, incorporation of air or gas into the mix, insufficient mixing or agitation to properly develop the protein or other film former so that it is able to envelope the fatty constituent of the dispersion, backmixing of the dispersion with freshly introduced material i.e. the mixing of downstream material with material further upstream thereby interfering with a first in first out mode of transfer through the mixer and finally microbial contamination of the product resulting from bacterial growth in the processing equipment.

OBJECTS

The major objective of the invention is to provide an improved continuous process for producing foods having a nut-like consistency with the following characteristics and advantages: (a) the requirement for less attention and manual labor thereby reducing production costs, (b) a reduction in mixing time for example from about 15 minutes on the average to about 6 minutes on the average, (c) greater product uniformity, in other words, the elimination of inconsistent or spoiled batches resulting from mismeasurements, overmixing or the like, (d) greater overall reliability, (e) continuous addition and mixing of components without the disadvantage of excessive oil exudation, the inability to form a stable dispersion or loss of nut-like texture, (f) the reliable exclusion of air or other gas from the mix, (g) the provision of sufficient mixing or agitation to develop the film former sufficiently to envelope the oil globules, (h) the avoidance of backmixing, and (i) the prevention of dead spots which if present could promote the growth of bacteria.

THE DRAWINGS

FIG. 1 is a semi-diagramatic vertical cross sectional view of an apparatus and method for carrying out the invention.

FIG. 2 is a vertical cross sectional view of FIG. 1.

FIG. 3 is a diagramatic schematic view illustrating another embodiment of the invention.

In the accomplishment of the foregoing and related advantages and objectives, this invention then comprises the features hereinafter fully described and particularly pointed out in the claims, the following description setting forth in detail certain illustrative embodiments of the invention these being indicative, however, of but a few of the various ways in which the principles of the invention may be employed.

SUMMARY OF THE INVENTION

Briefly, in accordance with the present invention a continuous process is provided for preparing a dispersion which is then dried to a moisture content of 10% or less while preserving its continuity. The process is carried out by providing a mixing means which includes a plurality of mixing zone portions distributed along the flow path of the material through the mixing means. The mixing means has at least one inlet between the mixing zone portion. An edible hydratable film forming substance and edible oleaginous material in liquid form is continuously introduced to the mixing means. By "continuous" is meant that the material is introduced over an extended period of time either as a flowing stream or as a series of spaced apart portions. Thus, the invention contemplates flowing material into the mixing means as is commonly accomplished in industry by flowing liquid through pipe, by means of a vibrating feeding tray or, if desired, a small container such as a two cup container can be repeatedly filled and emptied into the mixing means at spaced intervals within the scope of the term "continuous" as used herein. The slurry of oil and film former is continuously agitated and advanced through a portion of the mixing means. At the inlet located between the ends of the mixing means, water is continuously introduced also either as an uninterrupted stream or as a series of measured volumes into the slurry thus formed and agitated to produce an aqueous dispersion in which the film forming substance is hydrated by the added water to form, a continuous phase within which the water immiscible liquid is dispersed. In this way a stable dispersion is formed. The oleaginous liquid and film former can be continuously combined and continuously mixed together or mixed beforehand, for example in a separate mixer from the mixer in which the dispersion is formed. In that event, the premixing of oil and film former slurry can be done continuously or batchwise, and the oil and film former slurry that is thus provided can be fed into the dispersion mixing means at a rate bearing a selected proportion to the rate at which water is introduced into the inlet of the mixing means. The stable dispersion is expelled from the outlet end of the mixer and is thereafter slowly dried to a moisture content of 10% or less while preserving its continuity. It is preferred that the water, oleaginous material and film former are introduced at preselected rates to define a dispersion having a selected ratio of film former, oleaginous material and water. It is also preferred that the three components in the mixing means are mixed continuously and expelled continuously to provide continuous flow therethrough and that mixing is continued from the time that the water is added to the time that the dispersion is expelled.

In a preferred form of the invention, the water, oleaginous material and film former are mixed while excluding air and other gas therefrom to produce a stable degasified dispersion which is maintained free from gas throughout mixing.

In accordance with one preferred form of the invention, an elongated mixing chamber is provided with an inlet at one end and an outlet at the other end. An elongated agitator within the chamber is rotated during operation. Laterally extending blades on the agitator impart motion to the material and at least some of them are pitched to advance the product from the inlet to the outlet when the agitator is rotated at a given feed direction. It is preferred that the mixing chamber is in this case sealed to the atmosphere except at the inlet end. In operation about 1.5% by weight to 32% by weight of the edible hydratable film forming substance is introduced within a first zone of the mixer which comprises a feeding and packing zone. During the same time interval that the film former is introduced, from about 25% to 85% by weight of the oleaginous material is introduced continuously in liquid form at a point downstream from the inlet. Immediately downstream from the point of oil addition is a slurry mixing and air exclusion zone. At the end of the slurry mixing and air exclusion zone, water is continuously introduced in the amount of about 13.5% to 67% by weight in the same time interval. An aqueous dispersion forming zone is defined between the water addition point and the outlet of the mixer. In this zone the film forming substance is hydrated forming a continuous phase in which the water immiscible liquid is dispersed. This stable dispersion is expelled continuously from the outlet and slowly dried to a moisture content of 10% or less while preserving its continuity.

DETAILED DESCRIPTION

Refer now to FIG. 1 which illustrates in a semi-diagramatic form one mode of practicing the present invention.

As seen in FIG. 1, a continuous extruder mixer 10 is provided including from left to right a feeding and packing zone, a slurry mixing and air exclusion zone, an aqueous dispersion forming zone and an expulsion zone. The mixer is in this instance a mixer of the general kind described in patent Nos. 3,419,250 and 3,618,902 which are incorporated herein by reference except that the patented mixers do not include inlets at the bottom nor are they divided into zones. The mixer 10 is provided with a drive motor M and a hollow mixing and agitating chamber 12 having the form of a pair of parallel cylinders communicating with one another along an intermediate line. The motor M is coupled by drive shaft 16 that passes into the chamber 12 through an opening 14 with an agitator or rotor 16'. A similar rotor 17 parallel to rotor 16' rotates at the same speed and in the same direction and is coupled to rotor 16' by means of a geared connection (not shown). In the feeding and packing zone each of rotors 16' and 17 is provided with a flighted section 18 having helically extending flights 20 located below a feed hopper 21 into which the edible film former described above is continuously fed. While the hopper 21 has been shown in FIG. 1 as filled with dry granular solids 23 for purposes of illustration, it is preferred that the dry granular solids including or comprising the film former be fed continuously to the hopper of mixer as defined above to maintain the feeding and packing zone in a starved condition. Thus, the feeding and packing zone is only partly filled with product, and the augers advance the product toward the right in the figure faster than it is being fed to the hopper. This helps to promote packing of the solids and aids in excluding air.

Next, toward the right is a slurry mixing and air exclusion zone which includes a plurality of axially distributed mixing blades or paddles 22 each having a lenticular shape as seen from the end with the apeces on one rotor being spaced 180° from the apices on the other rotor. The edible oleaginous liquid is introduced through a line 24 between the packing zone and the slurry mixing zone.

At the right end of the slurry mixing zone water is added through a line 25 to define the beginning of the aqueous dispersion forming zone. Within the latter zone are provided additional mixing blades 26 some of which may be pitched forwardly, some of which may be pitched rearwardly, and some of which may have zero pitch. Again each has a lenticular shape as seen in cross section. The apices are indicated by numeral 28. The mixing chamber 12 has an end wall 30 with a flow control guide 32 slideably mounted thereon for upward and downward movement above a stationary gate 34 affixed to the wall 30 to define an opening 35 of variable cross section the size of which is controlled by the upward and downward movement of a screw 36 secured at its lower end to a bracket 38 that is rigidly fastened to the upper end of gate 32. The screw 36 is in turn threaded within a support 40 and is provided with a hand wheel 42 at its upper end which when turned will vary the size of the opening 35. When the outlet slot 35 is reduced in size, pressure within the mixer 12 will increase. This allows control of the dwell time and the extent of mixing.

Gate 32 is lowered enough so that the mixer 12 runs mostly full, say about three-fourths full. If gate 32 is lowered too much, material can back out the inlet and if not enough, there is not enough back pressure to produce adequate mixing and effective air exclusion. When a pump is used to convey the dispersion from mixer 12 to downstream equipment, the speed of the pump is used in place of gate 32 to control fullness of the mixer 12 and back pressure.

In the aqueous dispersion forming zone, the mixer is completely filled, the film former is hydrated encapsulating the globules of oil and almost all remaining air and other gas is excluded. Substantially all gas is eliminated at least by the time material reaches outlet 35.

The dispersion is expelled at 46 from the opening 35 and can then be cut by means of a blade 48 to produce segments 50 which may be dried in any suitable manner for example as described in the first three patents mentioned above while preserving the continuity of the dispersion. The moisture content after drying should be 10% or less but lower amounts e.g. below 4% are preferred. If desired, the extrudate 46 can be transferred, for example, by means of a pump to a separate extruder or other molding machine where it is formed into either ribbons or pieces as the case may be which are then passed through the drying oven.

The term "edible oleaginous material" or "liquid" is defined as any type of edible vegetable or animal oil or fat or mixture thereof. Examples are cottonseed oil, corn oil, lard, peanut oil, soy oil, safflower oil, butter, butter oil or margarine.

The "film former" is defined as any edible substance that will form a film around edible oil using any known process. Examples are nonfat milk solids, sodium caseinate, soy protein, egg abumen, egg yolk, wheat germ, gelatin, pea flour, bean flour, corn germ, dried whey, gelatinized starch, fish protein, bran protein, gum arabic and other hydrophilic coloids such as carboxy-methyl cellulose, agar agar, alginates, guar gum, carboxypropyl cellulose, carrageenin and combinations thereof. The general nature of the dispersion, its microscopic structure, and other general properties are the same as described in the first three mentioned patents and accordingly a further description here is unnecessary. Moreover, minor amounts of modifiers and additives can be used as described in the patents and the same formulas can be used as described in the examples thereof. Furthermore, the three major components oil or fat, film former and water, should have the same general ratio when combined as in the aforesaid patents, that is to say, oleaginous liquid from about 25.0% to 85.0%, film former from 1.5% to 32%, and water from 13.5% to 67%. All percentages and ratios herein are expressed on a weight basis.

Simulated nuts can be prepared using the following formula:

| | Weight Percent |
|---|---|
| Vegetable Oil | 59. % |
| Stabilized Wheat Germ (Powdered) | 29.5% |
| Egg Albumen (Dry) | 7.5% |
| Sugar | 3. % |
| Nut Flavoring | 1. % |
| | 100. % |

To the above formula an additional 27% water is added during mixing to form the complete dispersion. The germ, albumen and sugar is fed to the mixer at the rate of 400 gm. per minute, the vegetable oil and flavor is metered into the mixer approximately 10 inches from the point the premix enters the hopper 21 at the rate of 590 grams per minute. The water is metered into the mixer approximately 17 inches from the point of oil addition i.e. toward the right, at the rate of 280 gm. per minute. The mixer is operated with the agitators turning at the rate of 200 rpm and the discharge port control plate or gate 32 is adjusted to reduce the discharge rate to the point where the mixer is almost completely filled to prevent air entrapment in the dispersion and promote air exclusion in the zone between the inlet and the point of water addition.

Another suitable formula is as follows:

| | Percent by Weight |
|---|---|
| Vegetable Oil | 45.7 |
| Stabilized Wheat Germ (Powdered) | 22.0 |
| Sodium Caseinate | 2.9 |
| Sugar | 1.8 |
| Nut Flavor | 0.3 |
| Water | 27.3 |
| | 100.0% |

The wheat germ and caseinate together comprise the film former.

The dwell time in the mixer is approximately 6 minutes and drying is accomplished at 185° F. in a hot air dryer for about 7-8 hours. The extruded strip 46 is about one-eighth inch thick.

The specifications for a typical mixer used with the above material is as follows: agitator diameter 7⅞ inches, mixing chamber length 60 inches, a temperature control jacket is provided around the mixer and cooling water at 50° F. is circulated through it. The pipes 24 and 25 are 1 inch in diameter and the outlet 35 is horizontal and can be on either the end wall 30 or on the right side at the end of the cylinder tangent to the bottom of the mixer, the joints between the paddles or blades 26 of the agitator are filled with silver soldier, the mixing chamber is split longitudinally for easy access for cleaning, food grade monofilament teflon is used for packing, a 25 horsepower motor is used. Each section of the chamber is 8 inches in diameter. The flighted section is about 12 inches long, the slurry mixing and air exclusion zone is 17 inches long and contains 11 agitator blades on each rotor, of which 7 are pitched forwardly, and 4 have zero pitch. The dispersion forming zone is 32 inches long, contains 21 blades on each agitator 10 of which are pitched forwardly, and 10 zero pitch and one with a reversed pitch.

Refer now to FIG. 3 which illustrates another embodiment of the invention. As shown in the figure, the mixing means is divided into several separate portions 68, 70, 72, and 74, and each of the portions is connected to the next by a positive displacement pump indicated at 76, 78 and 80 coupled to the mixer portions by pipes. Each portion 68-74 can be a separate planetary mixer with its own motor.

Dry film former is fed to the mixing means by a gravimetric feeder 60 of suitable known construction via hopper 62. The gravimetric feeder 60 conveys the material at a predetermined controlled rate toward the right where it enters the inlet of an airlock 66 through hopper 62. From airlock 66, the premix material passes into the planatry mixer 68 and is fed from mixer 68 through the other mixers 70, 72 and 74 via positive displacement pumps 76, 78 and 80. Vegetable oil or other edible oleaginous material in liquid form is fed to mixer 68 by metering pump 84. Similarly, water is fed by metering pump 86 to planetary mixer 70 and to planetary mixer 72 by metering pump 88. The gravimetric feeder 60, metering pumps 84, 86 and 88 are each regulated by means of a feed rate controller 90. Thus, during operation the initial mixing of vegetable oil and film former is carried out in mixer 68 to form in a slurry of film former and oil. A vacuum pump 92 connected through suitable ducts to mixers 68, 70, 72 and 74 removes air or other gas from the dispersion. The planetary mixer 68 defines a slurry mixing and air exclusion zone as well as packing the premix more solidly. Mixers 70, 72 and 74 define an aqueous dispersion forming zone. Any residual air in mixers 70, 72 and 74 is removed by vacuum pump 92. The finished dispersion is removed from planetary mixer 74 by positive displacement pump 82. The dispersion is then subdivided and dried as described hereinabove or in any of the aforesaid patent references.

Many modifications can be made in the process. For example, the dry granular solids including or comprising the film former can be premixed as mentioned with the edible oleaginous liquid to form a slurry which can in turn be fed continuously to hopper 21 or introduced through line 24. The slurry mixing and air exclusion zone in that event comprises the entire portion of the mixer 10 toward the left of the water addition pipe 25. If this modification is made, the oil and granular solids can for example be mixed in a planetary batch mixer open to the atmosphere. The resulting slurry can be pumped continuously into the chamber of mixer 12 through hopper 21 while water is added continuously through pipe 25. The problem with the modification is that once the planetary batch mixer containing the slurry has been emptied it must be refilled and a new slurry prepared whereas by following the procedure outlined with reference to the figures, the process requires less attention and is continuous and more reliable.

What is claimed is:

1. A continuous process for forming a simulated nut-like food product, said process comprising:
   a. providing a means for continuously mixing the product having a plurality of mixing zone portions distributed along the flow path of the food product therethrough, and having at least one inlet between said mixing zone portions thereof,
   b. providing an edible hydratable film forming substance and an edible water immiscible oleaginous material in liquid form,
   c. continuously introducing the liquid and the film former to the mixing means to form a slurry,
   d. an inlet located intermediate to the ends of the mixing means continuously introducing water into the slurry, said film forming substance, oleaginous material and water comprising by weight about 1.5% to 32%, 25% to 85% and 13.5% to 67% respectively,
   e. continuously mixing and advancing the slurry with said added water to produce an aqueous dispersion within the mixing means in which the film forming substance is hydrated by the added water to form a stable dispersion comprising a continuous phase within which the water immiscible liquid is dispersed,
   f. expelling the stable dispersion from the outlet end of the mixer, and
   g. thereafter slowly drying the expelled dispersion to a moisture content of 10% or less while preserving its continuity.

2. A continuous process of forming a simulated nut-like food product, said process comprising, providing a means for continuously mixing the product having a plurality of mixing zone portions distributed along a flow path of the product therethrough and having at least one inlet means between said mixing zone portions, continuously introducing an edible hydratable film former and an edible water immiscible oleaginous material in liquid form into said mixing means at controlled rates to provide a slurry comprising by weight about 1.5% to 32% film forming material and about 25% to 85% oleaginous material, continuously agitating and advancing the oleaginous slurry composed of the material and the film former through one said portion of the mixing means while excluding air from the slurry, at the inlet located between said portions of the mixing means continuously introducing by weight about 13.5% to 67% water into the slurry and agitating the mixture of film former, oleaginous liquid and water to produce a stable aqueous dispersion in which the film former is hydrated by the added water to form a continuous phase within which the water immiscible liquid is dispersed while excluding air or other gas therefrom, expelling the stable dispersion from the outlet end of the mixture and thereafter slowly drying the expelled dispersion to a moisture content of 10% or less while preserving its continuity.

3. A continuous process for forming a simulated nut-like food product within an elongated mixer having an agitator extending from one end thereof to the other, said process comprising continuously introducing an edible hydratable film forming substance and an edible water immiscible oleaginous liquid in liquid form adjacent to one end of the mixer to form a slurry, continuously agitating and advancing the slurry composed of the liquid and the film former from said one end to the other end of the mixer and at a point between the ends of the mixer continuously intermixing water into the slurry to produce a stable aqueous dispersion wherein the film forming substance is hydrated by the added water to form a continuous phase within which the water immiscible liquid is dispersed, said film forming substance, oleaginous material and water comprising by weight about 1.5% to 32%, 25% to 85% and 13.5% to 67% respectively, continuously expelling the dispersion from the end of the mixer and thereafter slowly drying the expelled dispersion to a moisture content of 10% or less while preserving its continuity.

4. A continuous process for forming simulated nut-like food products from food material within an elongated mixing chamber having an inlet at one end, an outlet at the other end and at least one elongated rotor therein having laterally extending blade portions adapted to impart motion to the food material therein and at least some of the blade portions being pitched to advance the material therein from the inlet to the outlet when the rotor is rotated in a given feed direction, the mixing chamber being sealed to the atmosphere except at the inlet end; said process comprising continuously introducing in a selected time interval about 1.5% to 32% by weight of an edible hydratable film forming substance into the inlet of the mixing chamber and advancing the substance within a feeding and packing zone portion by rotating the rotor, during the same time interval continuously introducing from about 25% to 85% by weight of an edible water immiscible oleaginous material in liquid form at a point downstream from the inlet to form a slurry, continuously introducing water to the chamber in the amount of about 13.5% to 67% in the same interval at a point further downstream from the inlet and spaced from the outlet, a slurry mixing and air exclusion zone being defined between the point of water addition and oleaginous material addition, and an aqueous dispersion forming zone being defined between the water addition point and the outlet wherein the film forming substance is hydrated to form a continuous phase in which the water immiscible liquid is dispersed, expelling the resulting dispersion continuously from the outlet of the chamber and thereafter slowly drying the expelled dispersion to a moisture content of 10% or less while preserving its continuity.

* * * * *